(12) United States Patent
Blanc

(10) Patent No.: US 6,595,108 B1
(45) Date of Patent: Jul. 22, 2003

(54) EXTRACTION CHAMBER FOR AN AUTOMATIC MACHINE PREPARING HOT DRINKS

(75) Inventor: Jean-Pierre Blanc, Nice (FR)

(73) Assignee: Compagnie Mediterraneene des Cafes, Carros (FR)

(*) Notice: Subject to any disclaimer, the term of this patent is extended or adjusted under 35 U.S.C. 154(b) by 0 days.

(21) Appl. No.: 09/869,190

(22) PCT Filed: Dec. 24, 1998

(86) PCT No.: PCT/FR98/02871
§ 371 (c)(1),
(2), (4) Date: Jun. 25, 2001

(87) PCT Pub. No.: WO00/38558
PCT Pub. Date: Jul. 6, 2000

(51) Int. Cl.[7] ................................................ A47J 31/00
(52) U.S. Cl. ...................................... 99/295; 99/289 R
(58) Field of Search .......................... 99/279, 295, 298, 99/323, 289 R, 300

(56) References Cited

U.S. PATENT DOCUMENTS 3,007,392 A * 11/1961 Pecoraro et al.
5,454,293 A * 10/1995 Santi ........................ 99/289 R
5,755,149 A * 5/1998 Blanc et al. ............... 99/289 T
6,035,762 A * 3/2000 Ruckstuhl ............. 99/289 R X
6,431,055 B2 * 8/2002 Bonanno ............... 99/289 R X

FOREIGN PATENT DOCUMENTS

| EP | 0 002 987 | 7/1979 |
| EP | 0 867 142 | 9/1998 |
| FR | 2 770 987 | 5/1999 |
| WO | WO 95/17121 | 6/1995 |
| WO | WO 98/47418 | 10/1998 |

* cited by examiner

Primary Examiner—David H. Bollinger
(74) Attorney, Agent, or Firm—Young & Thompson

(57) ABSTRACT

An extraction chamber with a supply of tablets or small pre-measured quantities of ground coffee by vertical introduction, for an automatic machine for the preparation of hot beverages comprises two portions movable in a horizontal plane. A movable portion or half-chamber is adapted for the inlet of hot water so as to be able to move toward or away from each other to open or close the extraction chamber with a vertical screen and the other movable portion or half-chamber is provided with a vertical filter to receive and evacuate the coffee. The two portions are mounted vertically oscillably toward or away from each other about their transverse axis.

9 Claims, 7 Drawing Sheets

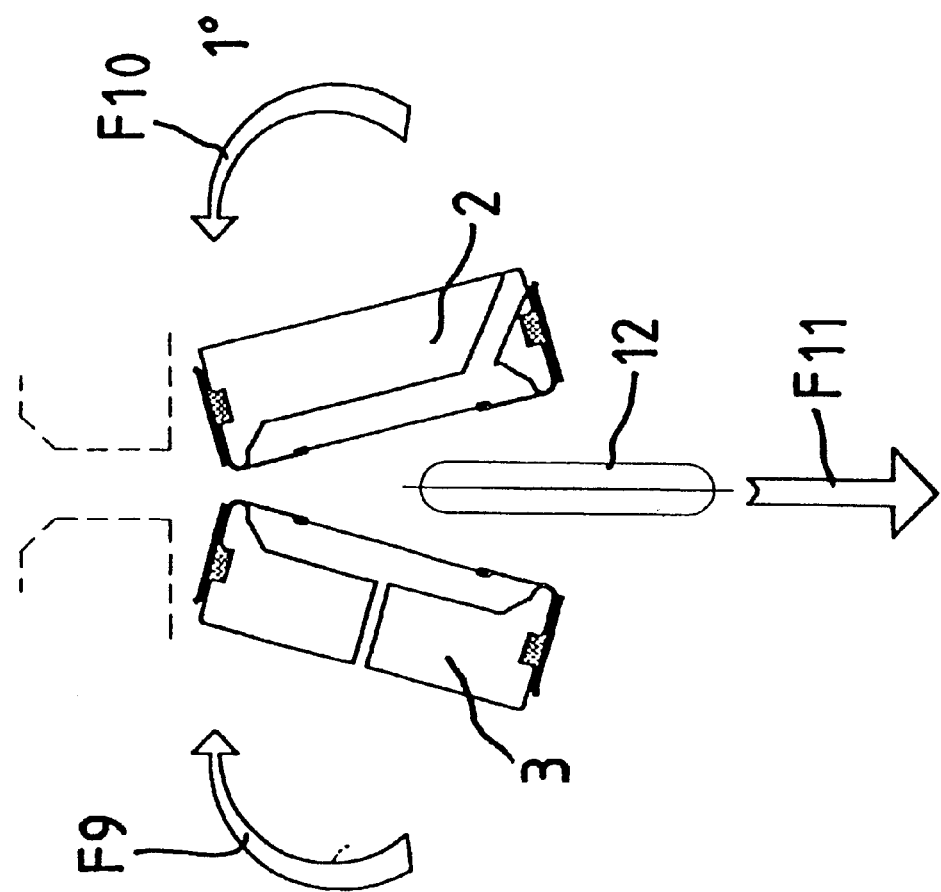
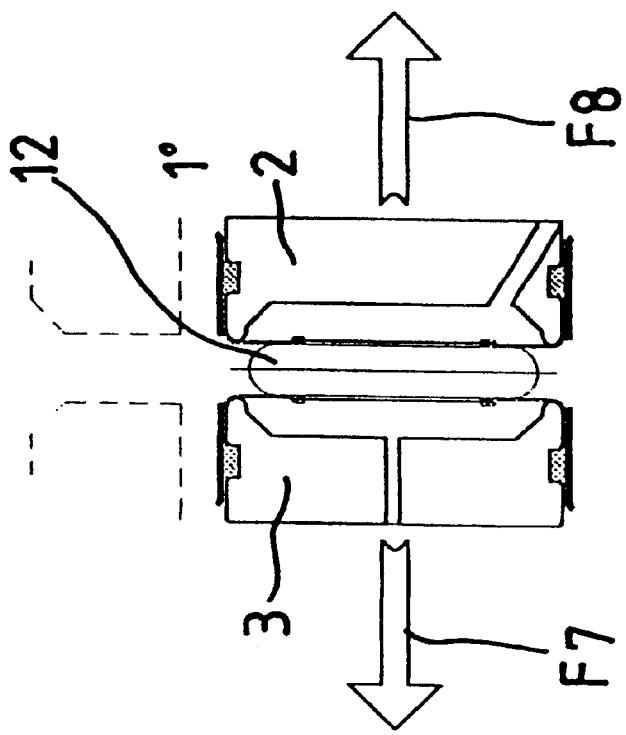
FIG. 5
FIG. 4

EXTRACTION CHAMBER FOR AN AUTOMATIC MACHINE PREPARING HOT DRINKS

CROSS REFERENCE TO RELATED APPLICATION

This is the 35 USC 371 national stage of international application PCT/FR98/02871 filed on Dec. 24, 1998, which designated the United States of America.

FIELD OF THE INVENTION

The invention has for its object an extraction chamber for an automatic machine for the preparation of hot beverages.

BACKGROUND OF THE INVENTION

Automatic machines using tablets or small pre-measured quantities with vertical introduction must receive or eject tablets that are sufficiently rigid that they do not stick and fall by gravity from the extraction chamber and this without using a complicated mechanical extractor. All these tablets or small quantities are either rigid or, if they are flexible, they comprise at least one rigid framework to facilitate their handling.

The state of the art can be defined by the following documents:

WO 95/07041: Espresso coffee maker characterized by the fact that the introduction of the tablet takes place in a vertical plane and the action of the piston is located in a horizontal plane and that the upper portion of said espresso coffee maker comprises a slot located in vertical alignment with and above abutments such that the positioning of the rigid member of each tablet or the like, between the abutments on the one hand and the boiler on the other hand, takes place by simple gravity. Each abutment is movable along an axis parallel to the longitudinal axis of the espresso coffee maker and an opening is provided in vertical alignment with and below the abutments such that when said abutments are manipulated so as to be parallel to each other, the tablet or the like is no longer retained by its rigid member and falls outside the espresso coffee maker by simple gravity.

WO 95/17121: Automatic machine for the preparation of infusions of hot beverages such as coffee, which comprises a group formed by a body placed facing a boiler, adapted to be brought together to form an infusion chamber, characterized by the fact that it comprises, between the body and the boiler, at the level of the infusion chamber:

reception means for an individual package containing the product to be infused, which are constituted by at least one retractable element extended in a substantially lower position adapted to immobilize temporarily said package between the body and the boiler, means for holding the package in position which are constituted by two lateral substantially vertical grooves in which said package slides and is maintained in vertical position when the reception means are present, and automatic ejection means for said package which are constituted by a retractable element which is retracted relative to the passage of the individual package to permit the ejection by simple gravity of the individual package, the movement of the individual package being perpendicular to the axis of the machine.

SUMMARY OF THE INVENTION

The invention permits, by means of this extraction chamber, using tablets or small pre-measured quantities formed of filter paper containing for example ground coffee, with or without a framework.

To this end, the extraction chamber, according to the invention, is of the type to supply tablets or small pre-measured quantities of ground coffee by vertical introduction, said extraction chamber is comprised of two portions movable in a horizontal plane, a movable portion or half-chamber is adapted for the inlet of hot water so as to be able to move toward or away from one another to close or open the extraction chamber with the vertical screen and the other vertical portion or half-chamber is provided with a vertical filter to receive and remove the coffee. The two portions movable in a horizontal plane are moreover mounted vertically oscillable one facing the other about their transverse axis. The two movable portions forming the extraction chamber are connected to each other to oscillate in reverse directions so as to open the chamber upwardly by forming a V to receive the supply, and to move together to close the extraction chamber during the extraction phase and finally to open the chamber downwardly by forming an inverted V, and this to permit the evacuation by gravity of the tablet or small quantity used.

In a preferred embodiment, the two movable portions each form vertically the volume of a half-chamber whose vertical bottom is movable to come, either flush with the vertical joint plane of the two portions, or, on the other hand, to retreat into the principal body of each portion to match all the volume of the half-chamber provided for this purpose in said principal body of each movable portion.

According to one embodiment, the bottom of the half-chamber is rigid but it is movably mounted on a means serving as a return spring which tends to unstick the rigid bottom of the principal body.

According to another embodiment, the bottom of the half-chamber is flexible, the central portion is rigid or semi-rigid and is held by a flexible peripheral membrane disposed at the inlet of each movable portion.

Each membrane is fixed on each movable portion by means such as a securement ring.

In other embodiments, the extraction chamber comprises guide means for the supply to position the supply substantially in a vertical position.

The lateral guide means for the supply can be adapted to hold it during the opening of each chamber to optimize non-sticking of the supply and the movable portions for the purpose of evacuation.

The guide means could comprise two vertical grooves adapted to coact with supply with a peripheral frame, said peripheral frame being inserted partially in the grooves.

The guide means could also form an abutment for at least one of the movable portions so as to limit its oscillatory movement.

BRIEF DESCRIPTION OF THE DRAWINGS

The accompanying drawings are given by way of example and are not limiting. They show a preferred embodiment according to the invention. They permit easy comprehension of the invention.

FIGS. 1, 2, 3, 4 and 5 show the motion of the two movable portions which form the extraction chamber.

FIG. 1 shows the starting position before introduction of the tablet or small quantity which is supported outside the chamber.

FIG. 2 shows the opening of the chamber by the two movable swingable portions and/or the quantity is introduced into the chamber and comes into abutment with the interior of the chamber.

FIG. 3 shows the closing of the chamber by bringing together the two movable portions for making coffee.

FIG. 4 shows the spacing of the two movable portions which form the extraction chamber when coffee-making is finished.

FIG. 5 shows the opening of the chamber by swinging of the two movable portions, thereby permitting the ejection by simple gravity of the tablet or a small quantity. FIG. 5 shows the return to the starting position of the operation of the extraction chamber.

FIG. 6 is a schematic view of the extraction chamber whose bottom is movable to an opening position with a screen and an ejecting filter. The movable vertical bottom is associated with a return spring disposed between the principal body of the movable portion and the bottom of the half-chamber.

FIG. 7 is a view according to FIG. 6 but in the closed position of the extraction chamber.

FIG. 8 is a front view of the screen which is movably mounted and which forms the movable bottom of a half-chamber for extraction.

FIG. 9 is a view of the screen, in transverse cross-section.

FIG. 10 shows an extraction chamber whose bottom is flexible, the central portion is rigid or semi-rigid and is held by a peripheral membrane disposed at the inlet of each half-chamber of each movable portion facing each other.

This view shows this embodiment of extraction chamber in the open position. On one of the movable portions, the central portion is formed by the screen, the other central portion is formed by the filter.

Figure 10:
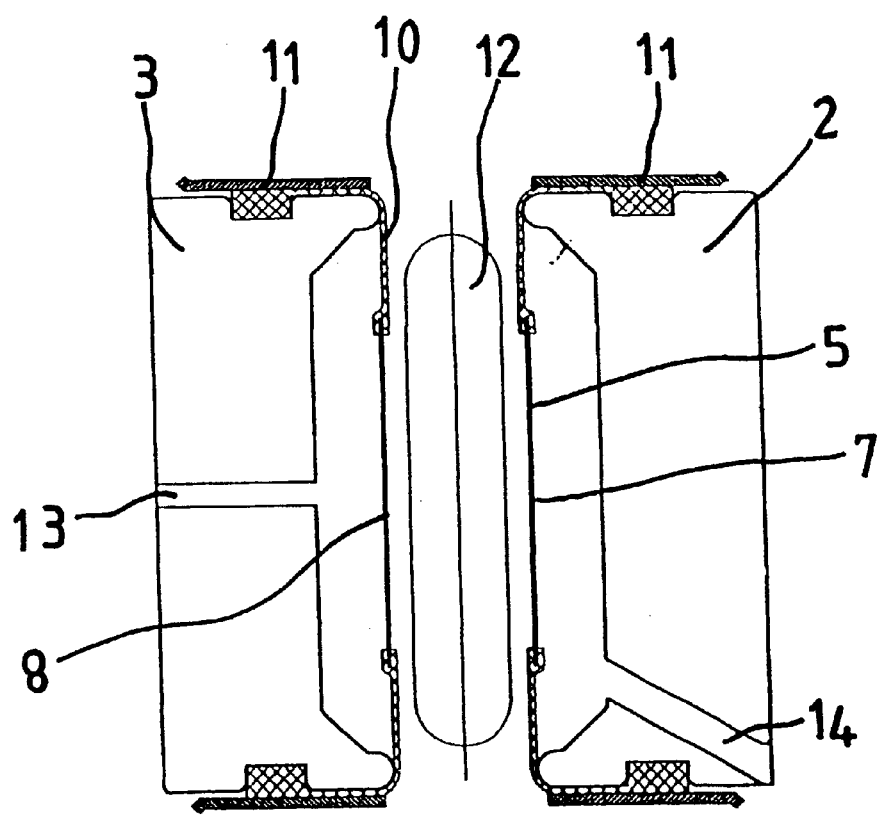
Figure 11:
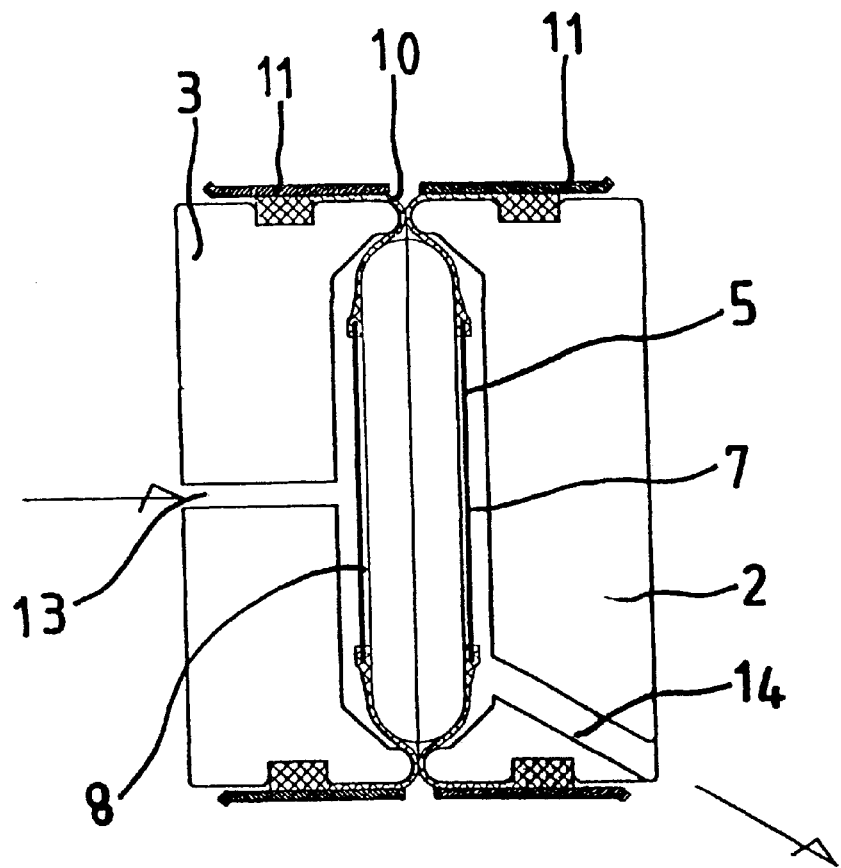

FIG. 11 is a schematic view of the extraction chamber shown in FIG. 10 but in the closed position.

Figure 12:
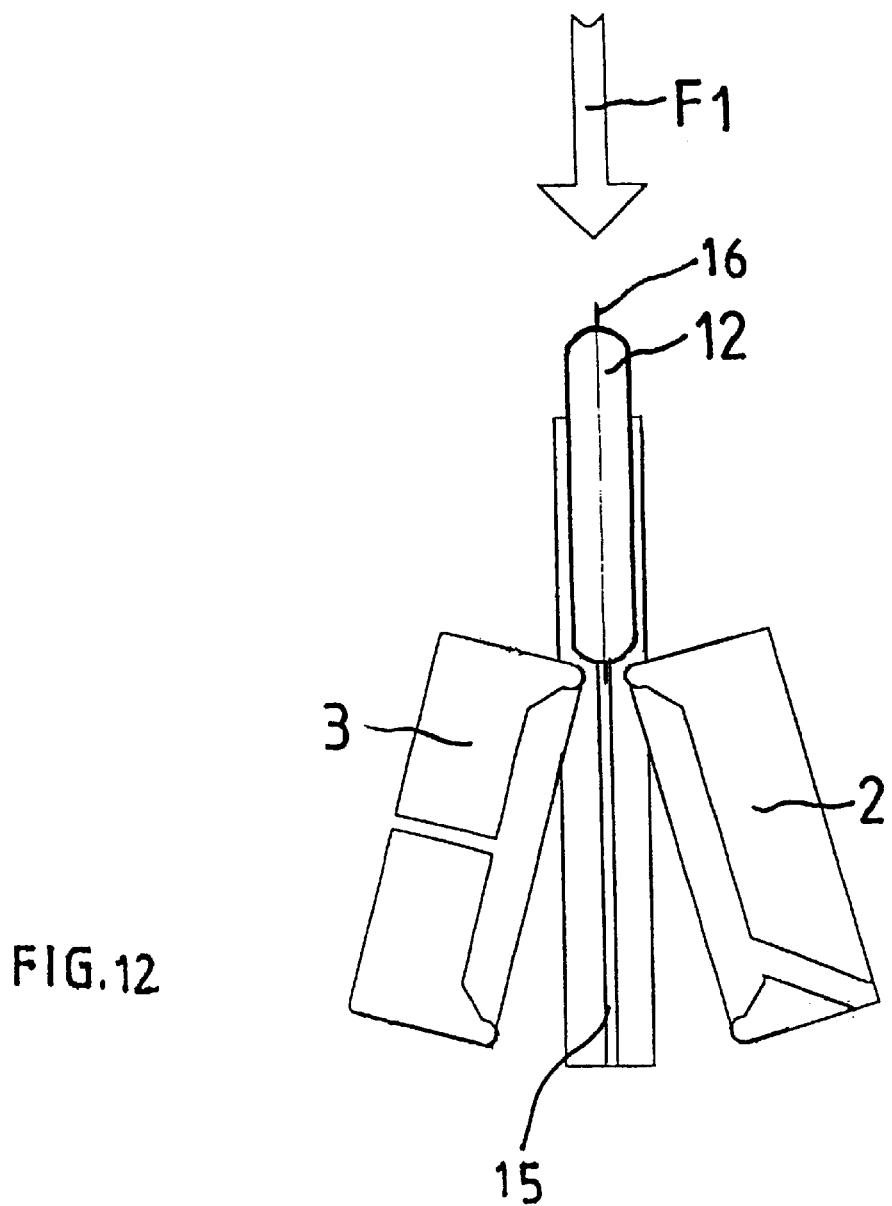

FIG. 12 shows another embodiment of the invention with guide means.

DETAILED DESCRIPTION OF THE INVENTION

The extraction chamber, according to the invention, is of the type supplied with a tablet 12 or small pre-measured quantity, for example of ground coffee. This type of small quantity must be introduced by vertical introductions as shown by the arrows F1 and F2, in FIGS. 1 and 2 (the small quantity is in abutment with the outside of the chamber).

Extraction chamber 1 is comprised by two movable portions 2 and 3. These two portions 2, 3 are movable in a horizontal plane.

A movable portion or half-chamber 3 is adapted for the inlet 13 of hot water with the vertical screen 8 and the other movable portion or half-chamber 2 is provided with a vertical filter 7 to receive and evacuate the coffee through the conduit 14.

The two portions movable in a horizontal plane are mounted moreover vertically swingably about their transverse axis.

Figure 3:
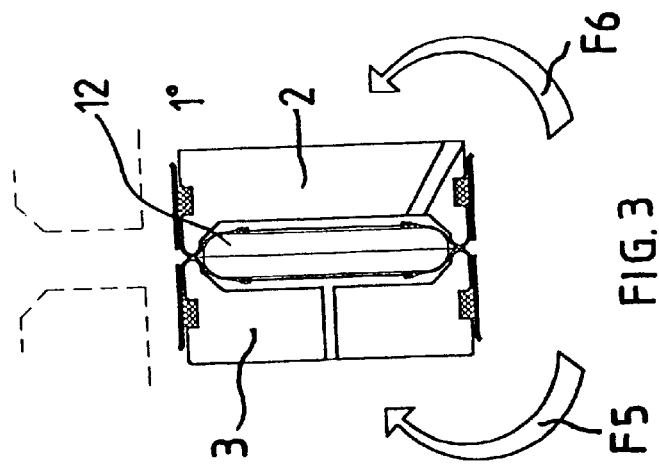
Figure 2:
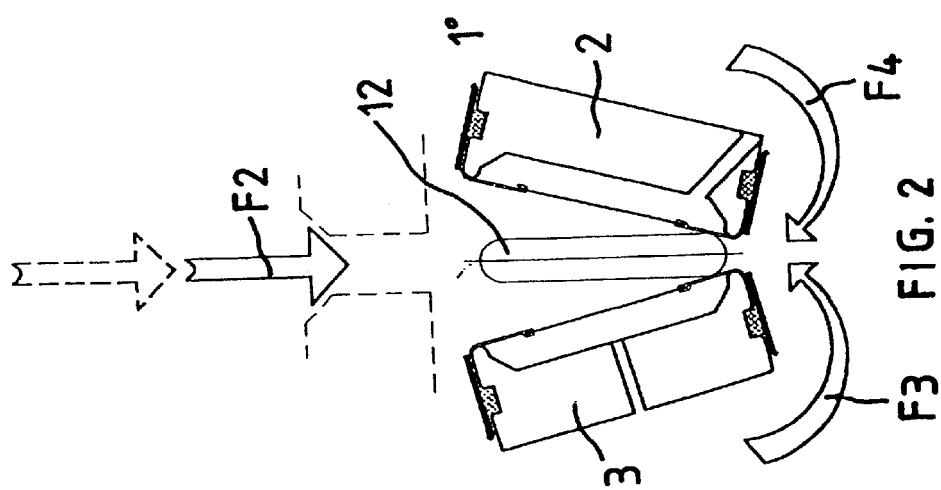
Figure 1:
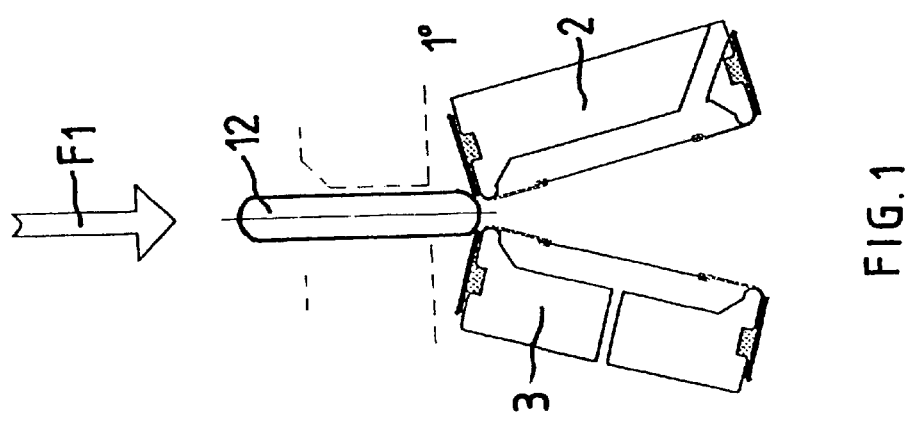

Thus, the two movable portions 2 and 3 forming the extraction chamber 1 are connected to each other to oscillate in opposite directions about their transverse axis so as to open the extraction chamber 1 upwardly by forming a V whose point is downward, thereby permitting the small quantity 12, which in FIG. 1 abutted the outside of the extraction chamber 1, to fall into the extraction chamber 1, as shown in FIG. 2, to come into abutment within the chamber 1.

To this end, the two movable portions 2 and 3 swing and come together with their lower portions as shown by the arrows F3 and F4 for each of the two movable portions.

These two movable portions 2 and 3 forming the extraction chamber 1 are connected to each other so as to move toward each other in the direction of the arrows 5 and 6, during the extraction phase. This moving together takes place in a horizontal plane. The extraction chamber 1 is thus closed.

Finally, the two movable portions 2 and 3 are connected to move apart from each other, in the direction of arrows F7 and F8, in a horizontal plane, and to open the extraction chamber 1, as shown in FIG. 4.

The two movable portions 2 and 3 are thus connected to oscillate according to the arrows F9 and F10 and to come together, in their upper portion, whilst they move apart in their lower portion to form an inverted V, which is to say that they open the extraction chamber 1 so as to free the small quantity 2, which falls by simple gravity as indicated by the arrow F11, which permits evacuation of the small quantity.

The two movable portions 2, 3 each form vertically a half-chamber 4, whose bottom 5 can be movable to come either flush with the vertical joint plane between the two portions 2 and 3 when the latter are against each other, or, on the contrary, the movable vertical bottom 5 retreats into the principal body of each movable portion 2, 3 to match the entire volume of the half-chamber provided for this purpose in the principal body of the two movable portions 2, 3.

Figure 6:
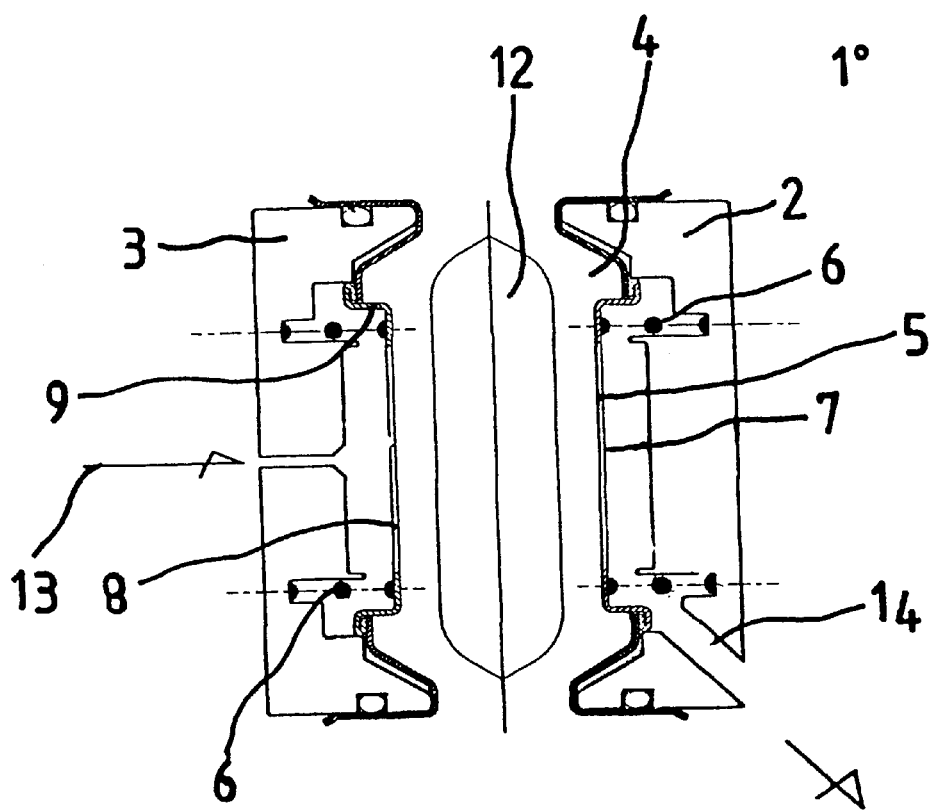
FIGS. 6 to 11 show detailed views of an extraction chamber comprised by two movable portions each providing two half-chambers in the vertical bottom and movable so as to be able to dislodge the small quantity.
Figure 7:
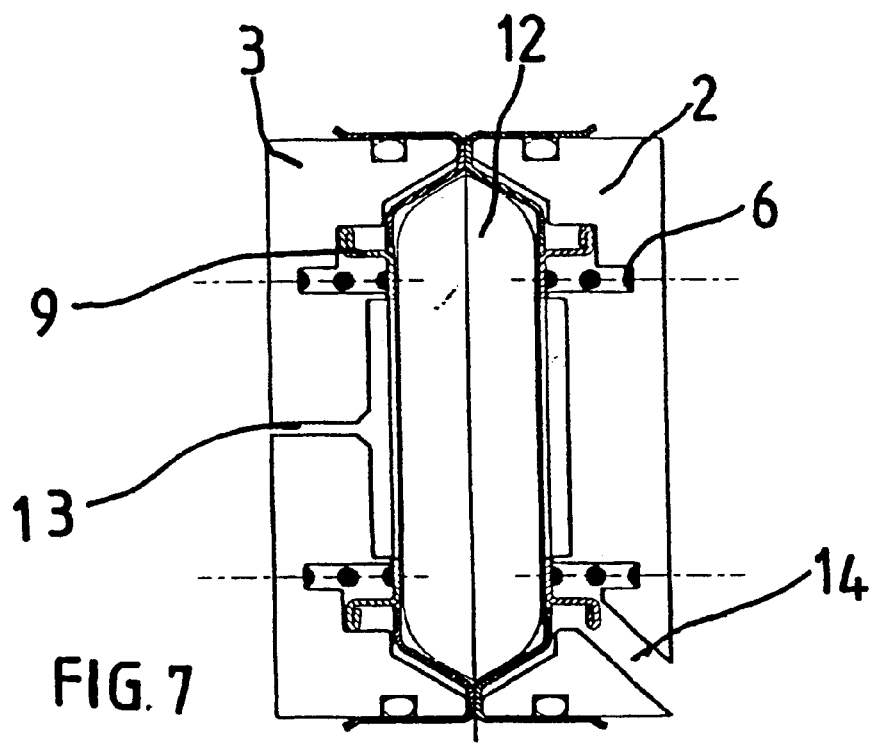

According to an embodiment shown in FIGS. 6 and 7, the bottom 5 of each half-chamber is rigid, it is movably mounted on means 6 performing a return function, which tends to unstick the rigid bottom 5 of the principal body 2 or 3.

According to the embodiment shown in FIG. 6, on the movable portion 2, on the movable bottom 5, the central portion of the movable bottom 5 is a filter 7.

On the movable portion 3, the movable bottom 5, in its central portion, is a screen 8. These two filter elements 7 and screen 8 are mounted on a rigid ring 9 which is disposed on each movable portion 2 and 3. A return spring 6 tends to press against this ring which carries, either the screen 8 or the filter 7 outwardly of the half-chamber of the movable portion 2 or 3.

It will thus be easily understood that when the two portions 2 and 3 are forcibly brought together, the small quantity 2 is firmly held in the extraction chamber 1, whilst when the two movable portions 2 and 3 move apart and particularly when they open downwardly, the small portion 2 is ejected by gravity and by the fact that the two movable bottoms 5 of the two portions 2 and 3 are pressed back by the return springs 6 (which line the bottom of the recesses provided for this purpose in the movable portions 2 and 3).

FIG. 7 shows an extraction phase when the two movable portions 2 and 3 are brought together against each other during the phase of producing coffee.

Figures 8, 9:
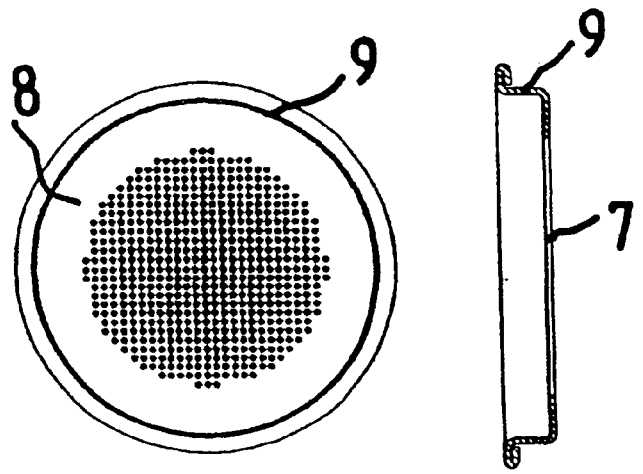

FIG. 8 shows the screen 8 seen from above, which screen is mounted on the rigid holding ring 9.

FIG. 9 is a transverse cross-sectional view of filter 7 mounted on its rigid ring 9.

According to another embodiment shown in FIG. 10, there is again seen the two movable portions 2 and 3 and the movable bottoms 5 as well as the filter 7 and the screen 8, but this time the screen 8 and the filter 7 are rigid or semi-rigid and are maintained each in its place in the movable portion 3 or the movable portion 2 by a flexible peripheral membrane 10, the membrane being disposed at the inlet of each movable portion 2 or 3.

This membrane is held on each movable portion 2 or 3, by a holding ring 11 or securement ring.

FIG. 12 shows another embodiment of the invention.

According to this embodiment, the guide means for the quantity 12 are formed.

A first function of these means is to position the quantity 12 in substantially vertical position. The vertical movement undergone by the quantity 12 during the different operation phases of the invention is improved by this guidance.

Moreover, the guide means can hold the quantity 12 laterally sufficiently to optimize unsticking. The tendency for the quantity 12 to remain in contact on the surface of one of the movable portions 2, 3 is thus overcome.

The guide means can replace or complement the action of a movable bottom 5 or of a membrane 10 as described above.

In the case shown in FIG. 12, the guide means comprise two vertical grooves 15. This embodiment is more particularly adapted for the use of quantities 12 with a peripheral frame 16.

As shown, the frame 16 is inserted in the groove 15. Lateral guidance and retention of the quantity 12 are thus ensured.

However, the formation of the means promoting unsticking of the quantity 12, such as a movable bottom, a flexible membrane or a guide means, are only particular embodiments of the invention and are not restrictive.

Thus, a natural unsticking of the quantity 12, during evacuation, can be produced by simple gravity.

In another embodiment, the guide means such as grooves 15 also permit forming an abutment for the movement of the movable portions 2, 3. They thus permit, without any supplemental construction element, limiting the angular freedom of swinging of one or both of the movable portions 2, 3.

The guide means thus take place in the stages of movement of the movable portions 2, 3.

REFERENCES

1. Extraction chamber
2. Movable portion or half-chamber
3. Movable portion or half-chamber
4. Half-chamber
5. Bottom of the half-chamber 4
6. Means serving for a return or spring
7. Filter
8. Screen
9. Rigid ring
10. Flexible peripheral membrane
11. Holding or securement ring
12. Tablet or pre-measured small quantity
13. Hot water inlet
14. Coffee outlet
15. Vertical groove
16. Frame of the tablet or small quantity
F1. Vertical introduction (quantity in abutment with the outside of the chamber)
F2. Vertical fall (quantity in abutment within the chamber)
F3, F4. Opening of the extraction chamber
F5, F6. Closing of the extraction chamber (coffee making)
F7, F8. Opening of the chamber (coffee making over)
F9, F10. Opening of the chamber, return to the starting position
F11. Ejection of the quantity

What is claimed is:

1. An extraction chamber adapted to be supplied with a pre-measured quantity of ground coffee by vertical introduction, the extraction chamber comprising:

a first portion and a second portion, said portions being movable in a horizontal plane so as to be able to approach and recede from one another to close or open the extraction chamber;

said first movable portion including an inlet for hot water and a vertical screen;

said second movable portion including a vertical filter and an outlet for brewed coffee;

said portions being mounted for vertical oscillation toward and away from each other;

said portions being connected to each other to oscillate in reverse directions so as a) to open the extraction chamber upwardly by forming a V to receive the pre-measured quantity, b) to approach each other to close the extraction chamber during an extraction phase, and finally c) to open the extraction chamber downwardly to form an inverted V, and permit evacuation by gravity of the pre-measured quantity.

2. The extraction chamber according to claim 1, wherein each movable portion forms vertically the volume of a half-chamber, each half-chamber having a principal body and a vertical bottom which is movable to come either into flush arrangement with a vertical joint plane of the portions, or to retract into the respective principal body.

3. The extraction chamber according to claim 2, wherein the vertical bottom of each half-chamber is rigid but movably mounted on means serving as a return spring which tends to unstick the rigid bottom of the principal body.

4. The extraction chamber according to claim 2, wherein the principal body of each half-chamber is flexible, the vertical screen and the central vertical filter are rigid or semi-rigid and each held by a flexible peripheral membrane disposed at an inlet of each movable portion.

5. The extraction chamber according to claim 4, wherein each membrane is fixed on each movable portion by a securement ring.

6. The extraction chamber according to claim 1, further comprising guide means for positioning the pre-measured quantity substantially in vertical position.

7. The extraction chamber according to claim 6, wherein the guide means are adapted to retain the pre-measured quantity laterally during opening of the extraction chamber to optimize unsticking of the pre-measured quantity and of the movable portions for discharge.

8. The extraction chamber according to claim 6, wherein the guide means comprise two vertical grooves, and said pre-measured quantity includes a peripheral frame structured and arranged to be inserted at least partially into the two grooves.

9. The extraction chamber according to claim 6, wherein the guide means also form an abutment which limits the oscillatory movement of at least one of the movable portions.

* * * * *